United States Patent
Kurita et al.

(10) Patent No.: US 6,306,532 B1
(45) Date of Patent: Oct. 23, 2001

(54) VEHICULAR MOUNTABLE FUEL CELL SYSTEM

(75) Inventors: Kenji Kurita, Nagoya; Koji Kiryu, Aichi-ken; Kazumasa Takada, Ogaki; Akira Matsuoka, Chiryu, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/323,551

(22) Filed: Jun. 1, 1999

(30) Foreign Application Priority Data

May 31, 1998 (JP) .................................................. 10-167744

(51) Int. Cl.[7] ............................. H01M 8/04; H01M 8/06
(52) U.S. Cl. ................................................. 429/20; 429/22
(58) Field of Search .................................... 429/19, 22, 20

(56) References Cited

U.S. PATENT DOCUMENTS

| | | | |
|---|---|---|---|
| 4,001,041 | * | 1/1977 | Menard ................................ 429/19 X |
| 4,128,700 | * | 12/1978 | Sederquist ........................... 429/19 X |
| 4,678,723 | * | 7/1987 | Wertheim ............................ 429/19 X |
| 4,759,997 | * | 7/1988 | Ohyauchi et al. ..................... 429/19 |
| 4,865,926 | * | 9/1989 | Levy et al. ............................ 429/20 |
| 4,904,548 | * | 2/1990 | Tajima .................................. 429/22 |
| 5,190,726 | * | 3/1993 | Shinoki et al. .................... 429/22 X |
| 5,376,470 | * | 12/1994 | Sprouse ................................ 429/19 |
| 5,397,656 | * | 3/1995 | Morimoto et al. ................. 429/19 X |

FOREIGN PATENT DOCUMENTS

| | | | |
|---|---|---|---|
| 729196 | * | 8/1996 | (EP) . |
| 5-283091 | | 10/1993 | (JP) . |
| 7-326376 | | 12/1995 | (JP) . |
| 8-203547 | | 8/1996 | (JP) . |

* cited by examiner

*Primary Examiner*—Stephen Kalafut
(74) *Attorney, Agent, or Firm*—Oblon, Spivak, McCleland, Maier & Neustadt, P.C.

(57) ABSTRACT

A vehicular mountable fuel cell system constituted by combusting means 1 for combusting off gas from a fuel cell 4 supplied with reformed gas from a reformer 3 and a turbine compressor 2 for supplying air to the fuel cell 4 by compressing air at a compressor unit 22 by operating combustion energy of the combusting means 1 to a turbine unit 21 to thereby reduce power of a motor for driving to rotate the turbine compressor by recovering power by effectively using waste gas.

10 Claims, 9 Drawing Sheets

— FC SUPPLY AIR LINE
--- FC SUPPLY REFORMED GAS LINE
— FC EXHAUST AIR LINE
--- FC EXHAUST REFORMED GAS LINE
— BURNER COMBUSTION GAS
—·— TURBINE EXHAUST GAS

- —— FC SUPPLY AIR LINE
- ——— FC SUPPLY REFORMED GAS LINE
- —— FC EXHAUST AIR LINE
- ——— FC EXHAUST REFORMED GAS LINE
- —— BURNER COMBUSTION GAS
- ——— TURBINE EXHAUST GAS

VEHICULAR MOUNTABLE FUEL CELL SYSTEM

BACKGROUND OF THE INVENTION

1. Field of the Invention

The present invention relates to a vehicular mountable fuel cell system suitable for vehicular mounting, comprising a combustor for combusting off gas from a fuel cell supplied with reformed gas from a reformer, and a turbine compressor for supplying air to the fuel cell by compressing air at a compressor unit by utilizing combustion energy of the combustor for recovering power by effectively utilizing waste gas.

2. Description of the Related Art

It is known in a polymer electrolyte type fuel cell (PEFC) that when the gas pressure of hydrogen and oxygen used in the reaction is increased, the electrode reaction is activated and an output level of the cell is elevated. However, for an increase in the supply gas pressure, the power of the air compressor used as a supply source of oxidizing air must also be increased and so the net output of the gas pressurizing system is not necessarily improved.

Further, 100% of the hydrogen and oxygen supplied to a fuel cell is not consumed but 20 through 50% of the hydrogen and 30 through 70% of the oxygen (in respect of supply amounts) are exhausted as waste gas. As methods of utilizing the waste gas, there have been proposed a method for resupplying the waste gas to a fuel cell stack FC by installing recirculating lines RL as shown by FIG. 9 (JP-A-8-203547), and a method of utilizing the waste gas as a fuel for a burner for an evaporator V of a reformer K as shown by FIG. 10 (JP-A-5-283091).

Further, although a fuel cell (FC) constitutes a noiseless and nonpollutant energy source, a key point for high efficiency of the overall system resides in how to reduce the power of an air supply apparatus such as an air compressor. In an FC power generating apparatus which is referred to as a normal pressure type which is operated at a pressure near to atmospheric pressure, the required power of the air supply apparatus is small but the total power generated is small and so the overall efficiency is not necessarily regarded as excellent.

Similarly, in a pressurized type system, the power generated by the FC is remarkably increased but the power required for the air supply apparatus is also increased. An actual system is operated at a pressure producing the best balance of the system efficiency in line with the actual components, or the system efficiency is increased by controlling the pressure of the air supply apparatus in accordance with a required load.

Further, according to a fuel cell power generating apparatus of a solid polymer membrane type, the ionic conductivity of the membrane-needs to increased by humidifying the solid polymer membrane. For that purpose, a filel gas ($H_2$ or the like) and an oxidant gas (air or the like) are humidified to thereby supply moisture to the solid polymer membrane. As a humidifying method, there is generally carried out bubbling or directly supplying water W to a fuel gas F and an oxidant gas O as shown by FIG. 1 (JP-A-7-326376). According to the conventional method of resupplying waste gas to the fuel. cell stack FC by installing the recirculating lines RL, when reformed gas is used, there occurs a problem that when the reformed gas is recirculated, the concentration of hydrogen is reduced.

Further, according to the method of utilizing waste gas as fuel for a burner for the evaporator V of the reformer K, although this method is realistic, there occurs a problem in which the effectiveness differs depending on the constitution of the system.

In the normal pressure type, when characteristics of FC or the power of the auxiliary machines are changed, there occurs a problem that a balance point needs to be reevaluated and, depending on operating conditions, a very inefficient system may result. Further, in the case of the pressurizing type, much time is taken in controlling the pressure of the air supply apparatus and the method is unsuitable for a system in which the load is rapidly changed as occurs particularly in a FC for a vehicle.

In the bubbling operation mentioned above, there is needed a heat source for a bubbler. Further, according to the method of supplying water W directly to the gases F and O, there occurs a problem in that the temperature of the gases may be lowered by the humidifying operation, or water clogging may be caused in a gas pipe or in the fuel cell.

As a conventional means for resolving such a problem, there has been adopted a method of heating the humidifying water and elevating the temperature thereof by thermally exchanging heat of an off gas from a fuel cell and the reaction heat of the fuel cell with the humidifying water. However, the temperature stays low due to a deficiency in the heat amount when such heat is used, and accordingly sufficient heat exchange is difficult.

SUMMARY OF THE INVENTION

According to the invention, the off gas from a fuel cell supplied with a reformed gas from a reformer is combusted by a combustor, air is compressed at a compressor unit of a turbine compressor by utilizing combustion energy of the combustor and the air is supplied to the fuel cell. Further, the invention reduces the power required of a motor for driving the turbine compressor, thereby recovering power by effectively using the waste gas.

Further, according to the invention, an amount of oxygen supplied from the compressor unit to the fuel cell and an amount of hydrogen supplied from the reformer to the fuel cell are detected by using flow rate sensors, a flow rate of oxygen and a flow rate of hydrogen supplied from the fuel cell to the combustor are calculated based on the detected amount of oxygen and the detected amount of hydrogen and the flow rate of oxygen, and the flow rate of hydrogen supplied to the combustor are controlled by a flow rate controller. This accelerates the response of the system such that the system can be utilized as a vehicular FC and promotes the system efficiency.

Further, according to the invention, heat of combustion exhaust gas exhausted from the combustor, heat of humidifying water from the humidifying apparatus and heat of oxygen, (air) as an oxidant gas for fuel gas from the compressor unit are exchanged by heat exchangers. This enables sufficient heat exchange and stable operation of the fuel cell.

According to a first aspect of the invention, there is provided a vehicular mountable fuel cell system comprising a combustor for combusting an off gas from a fuel cell supplied with a reformed gas from a reformer and a turbine compressor for supplying air to the fuel cell by compressing air at a compressor unit by utilizing combustion energy of the combustor.

According to a second aspect of the invention, in the vehicular mountable fuel cell system according to the first aspect, the reformer includes an evaporation burner for combusting an evaporating fuel.

According to a third aspect of the invention, in the vehicular mountable fuel cell system according to the first aspect, there is further a heat exchanger for maintaining the temperature of a gas pipe at an inlet portion of the fuel cell by introducing a combustion exhaust gas exhausted from the turbine unit of the turbine compressor.

According to a fourth aspect of the invention, in the vehicular mountable fuel cell system according to the third aspect, there is further a humidifying apparatus communicating with a water tank for humidifying the air supplied from the compressor unit to the fuel cell.

According to a fifth aspect of the invention, in the vehicular mountable fuel cell system according to the fourth aspect, there is further a humidifying apparatus for humidifying the reformed gas supplied from the reformer to the fuel cell.

According to a sixth aspect of the invention, in the vehicular mountable fuel cell system according to the fifth aspect, there is further a preliminary heating apparatus for preliminarily heating water in a tank of the humidifying apparatus.

According to a seventh aspect of the invention, in the vehicular mountable fuel cell system according to the first aspect, there is further a flow rate sensor for detecting a flow rate of the air supplied from the compressor unit to the fuel cell, a flow rate sensor for detecting a flow rate of the reformed gas supplied from the reformer to the fuel cell, calculating means for calculating a flow rate of oxygen and a flow rate of hydrogen supplied from the fuel cell to the combustor based on a detected amount of the air and a detected amount of the reformed gas, and flow rate controlling means for controlling the flow rate of oxygen and the flow rate of hydrogen supplied to the combustor in accordance with a control signal from the calculating means.

According to an eighth aspect of the invention, in the vehicular mountable fuel cell system according to the seventh aspect, the calculating means monitors current and voltage of the fuel cell.

According to a ninth aspect of the invention, in the vehicular mountable fuel cell system according to the eighth aspect, the calculating means calculates the flow rate of oxygen and the flow rate of hydrogen supplied to the combustor based on the monitored current and the monitored voltage of the fuel cell.

According to a tenth aspect of the invention, in the vehicular mountable fuel cell system according to the fifth aspect, the heat exchanger is constituted such that heat exchange is carried out among the combustion exhaust gas exhausted from the combustor, humidifying water from the humidifying apparatus and oxygen (air) as an oxidant gas from the compressor unit.

According to an eleventh aspect of the invention, in the vehicular mountable fuel cell system according to the tenth aspect, the heat exchanger is heated by the combustion exhaust gas exhausted from the combustor.

According to a twelfth aspect of the invention, in the vehicular mountable fuel cell system according to the eleventh aspect, the heat exchanger comprises a first heat exchanger for heating the oxygen (air) as the oxidant gas from the compressor unit and a second heat exchanger for heating the reformed gas from the reformer.

According to a thirteenth aspect of the invention, in the vehicular mountable fuel cell system according to the twelfth aspect, the second heat exchanger for heating the reformed gas from the reformer includes a flow rate controller for controlling a flow rate of the combustion exhaust gas exhausted and supplied from the combustor.

According to a fourteenth aspect of the invention, in the vehicular mountable fuel cell system according to the thirteenth aspect, each of the first and the second heat exchangers includes a bypass path and bypass flow rate controller for controlling a bypass flow rate of the combustion exhaust gas in the bypass path.

According to the first aspect, the combustor combusts the off gas from the fuel cell supplied with the reformed gas from the reformer and air is compressed at the compressor unit of the turbine compressor by utilizing the combustion energy of the combusting means, and air is supplied to the fuel cell, and accordingly power is recovered by effectively utilizing waste gas, and the power of a motor for driving the turbine compressor is reduced.

According to the second aspect, the reformer includes the evaporation burner for combusting the evaporating fuel and accordingly the response of the reformer is promoted.

According to the third aspect, the combustion exhaust gas exhausted from the turbine unit of the turbine compressor is introduced and temperature of the gas pipe at the inlet portion of the fuel cell is maintained by the heat exchanger, and accordingly the condensation of gas introduced into the fuel cell is restrained.

According to the fourth aspect, the humidifying apparatus communicating with the water tank humidifies air supplied from the compressor unit to the fuel cell, and accordingly the temperature of air introduced into the fuel cell is controlled and stable operation of the fuel cell is made feasible.

According to the fifth aspect, the humidifying apparatus humidifies reformed gas supplied from the reformer to the fuel cell, and accordingly the temperature of gas introduced into the fuel cell is controlled and stable operation of the fuel cell is made feasible.

According to the sixth aspect, the preliminary heating apparatus preliminarily heats water in the tank of the humidifying apparatus, and accordingly optimum humidifying is realized.

According to the seventh aspect, the flow rate sensor detects the amount of air supplied from the compressor unit to the fuel cell, the flow rate sensor detects the amount of the reformed gas supplied from the reformer to the fuel cell, the calculating means calculates the flow rate of oxygen and the flow rate of hydrogen supplied from the fuel cell to the combustor based on the detected amount of air and the detected amount of the reformed gas, and the flow rate controller controls the flow rate of oxygen and the flow rate of hydrogen supplied to the combustor in accordance with the control signal from the calculating means, and accordingly the response of the system is promoted such that the system can be utilized as a vehicular FC and the system efficiency is promoted.

According to the eighth aspect, the calculating means monitors the current and the voltage of the fuel cell, and accordingly control in accordance with a power generating state of the fuel cell is made feasible.

According to the ninth aspect, the calculating means calculates the flow rate of oxygen and the flow rate of hydrogen supplied to the combustor based on the monitored current and the monitored voltage of the fuel cell, and accordingly control in accordance with the power generating state of the fuel cell is realized.

According to the tenth aspect, heat of the combustion exhaust, gas exhausted from the combustor, heat of humidifying water from the humidifying apparatus and heat of oxygen (air) as the oxidant gas from the compressor unit are exchanged by the heat exchanger, and therefore sufficient heat exchange and stable operation of the fuel cell are made feasible.

According to the eleventh aspect, the heat exchanger is heated by the combustion exhaust gas exhausted from the combustor, and accordingly efficient heat exchange and stable operation of the fuel cell are made feasible.

According to the twelfth aspect, the first heat exchanger of the heat exchanger unit heats oxygen (air) as oxidant gas from the compressor unit and the second heat exchanger heats the reformed gas from the reformer, and accordingly efficient heat exchange and stable operation of the fuel cell are made feasible.

According to the thirteenth aspect, the flow rate controller of the second heat exchanger for heating the reformed gas from the reformer controls the flow rate of the combustion exhaust gas exhausted and supplied from the combustor, and accordingly the temperature of the reformed gas introduced into the fuel cell is optimally maintained and stable operation of the fuel cell is made feasible.

According to the fourteenth aspect, the bypass flow rate controller of the first and second heat exchangers controls the bypass flow rates of the combustion exhaust gas in the bypass paths, and accordingly temperatures of the reformed gas and-the oxidant gas for fuel gas introduced into the fuel cell are optimally maintained and stable operation of the fuel cell is made feasible.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
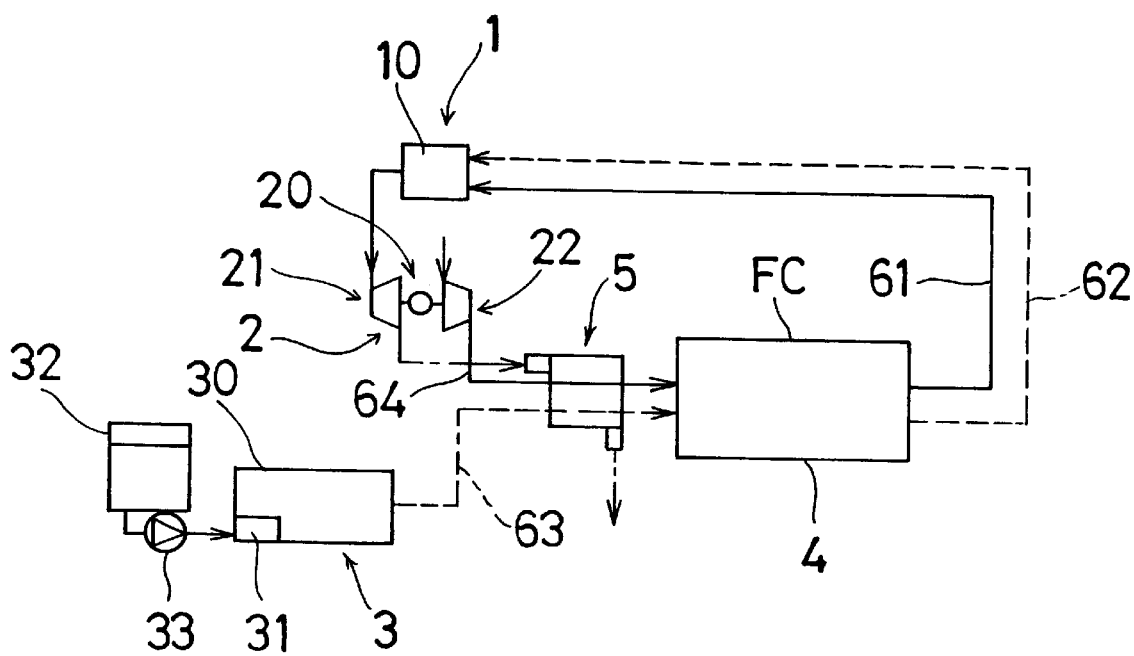
FIG. 1 is a block diagram showing a fuel cell system according to a first embodiment of the invention.

Referring now to the drawings, wherein like reference numerals designate identical or corresponding parts throughout the several views, an explanation will be given of embodiments according to the invention in reference to the drawings as follows.

First Embodiment

A vehicular mountable fuel cell system according to the first embodiment comprises a combustor 1 for combusting off gas from a fuel cell 4 supplied with reformed gas from a reformer 3, and a turbine compressor 2 for supplying air to the fuel cell 4 by compressing air at a compressor unit 22 by transferring combustion energy of the combustor 1 to a turbine unit 21, as shown in FIG. 1.

The combustor 1 is constituted by a burner 10 communicating with the fuel cell 4 (fuel cell stack) via an FC exhaust air line 61 and an FC exhaust reformed gas line 62. It combusts the PC exhaust air and the FC exhaust reformed gas supplied from the fuel cell 4 via the FC exhaust air line 61 and the FC exhaust reformed gas line 62 and exhausts high temperature combustion gas.

The turbine compressor 2 has a motor 20 as a rotational drive source, the turbine unit 21 driven to rotate by the combustion energy of the combustor 1 and the compressor unit 22 for supplying compressed air to the fuel cell 4.

The reformer 3 includes an evaporation burner 31 supplied with a methanol water mixture, as an evaporating fuel stored in a methanol water mixture tank 32, by a methanol pump 33 for combusting the mixture and has a reformer main body 30 for evaporating reformed fuel and producing reformed gas.

A heat exchanger 5 includes an FC supply reformed gas line 63 connecting the reformer 3 and the fuel cell 4 and an FC supply air line 64 connecting the compressor unit 22 and the fuel cell 4 at an inlet portion of the fuel cell 4. It also receives combustion exhaust gas exhausted from the turbine unit 21 of the turbine compressor 2 to maintain the temperature of the gas pipes 63 and 64 at the inlet portion of the fuel cell 4.

According to the first embodiment, the burner 10 of the combustor 1 combusts waste gas and waste air from the fuel cell, generates combustion energy to operate the turbine unit 21 of the turbine compressor 2 thereby driving the compressor unit 22. By driving the compressor unit 22, air is compressed in the compressor unit 22 and supplied to the fuel cell 4.

Figure 2:
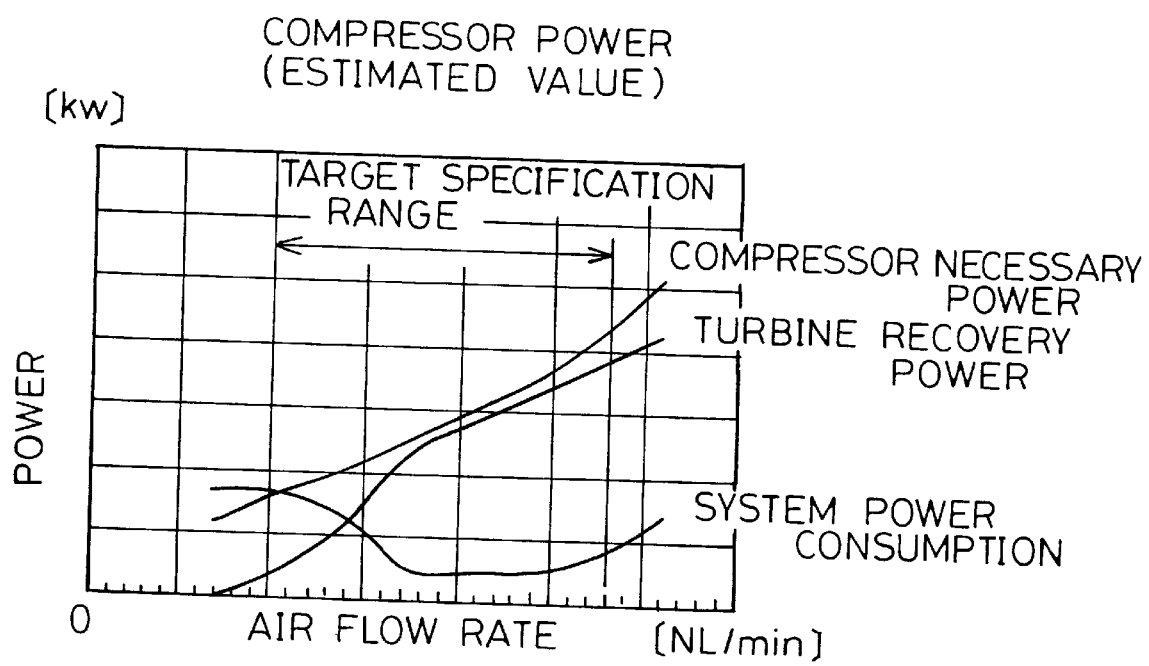
FIG. 2 is a graph showing a relationship between an air flow rate and power in the fuel cell system according to the first embodiment.

According to the first embodiment, power is recovered by effectively utilizing waste gas to thereby drive the turbine compressor 2, and accordingly the rotational drive of the motor 20 is assisted, the required power of the motor 20 is reduced and the power consumption of the system is reduced by 1 to 3 KW, as shown by FIG. 2.

Further, according to the first embodiment, the evaporating burner 31 combusts methanol as evaporating fuel, and accordingly the response of the reformer 3 is improved.

Further, combustion exhaust gas exhausted from the turbine unit 21 of the turbine compressor 2 is introduced into the heat exchanger 5, and the temperatures of the gas pipes 63 and 64 at the inlet portion of the fuel cell 4 are maintained, and accordingly condensation of gas introduced into the fuel cell 4 is restrained.

Second Embodiment

Figure 3:
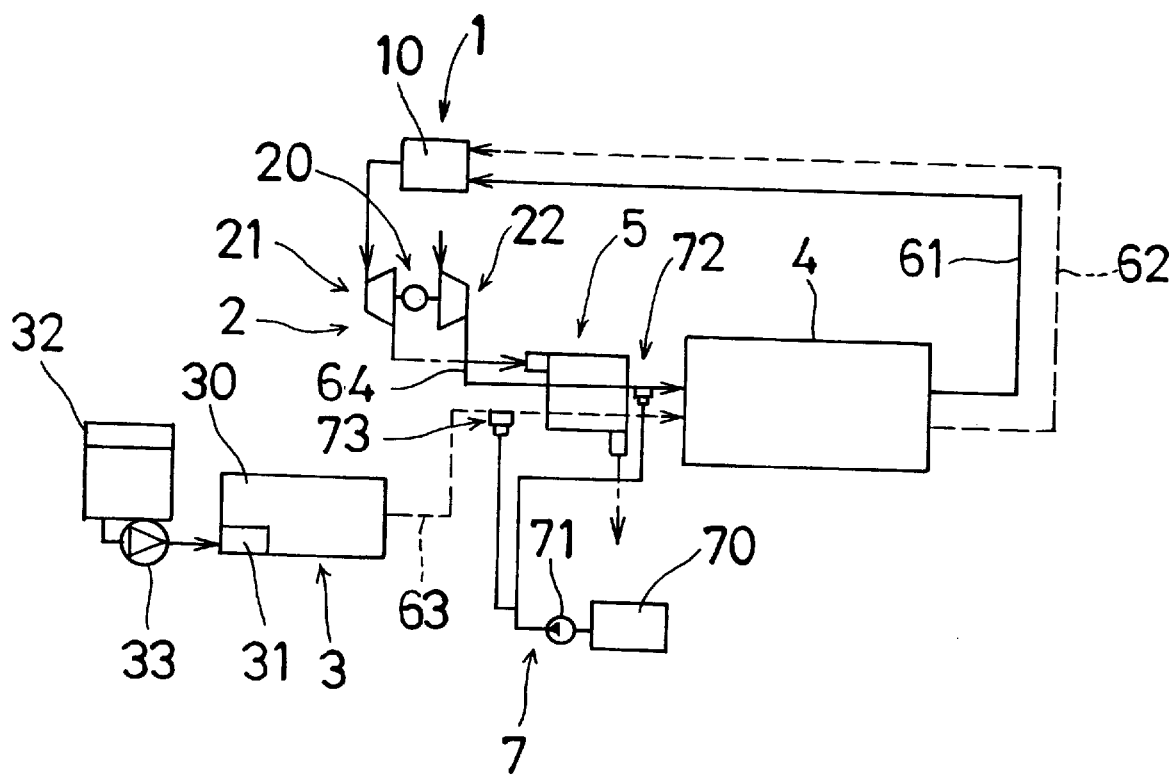
FIG. 3 is a block diagram showing a filel cell system according to a second embodiment of the invention.

As shown by FIG. 3, the vehicular mountable fuel cell system according to the second embodiment differs from the first embodiment by adding a humidifying apparatus 7. The humidifying apparatus 7 comprises a water pump 71 communicating with a water tank 70, a first nozzle 72 communicated with the line 64 downstream of the heat exchanger 5 for humidifying air supplied from the compressor unit 22 to the fuel cell 4, and a second nozzle 73 connected to the line 63 upstream of the heat exchanger 5 for humidifying the reformed gas supplied from the reformer 3 to the fuel cell 4.

According to the second embodiment, the first nozzle 72 communicating with the water tank 70 humidifies air supplied from the compressor unit 22 to the fuel cell 4, and accordingly the temperature of air introduced into the fuel cell 4 is controlled and stable operation of the fuel cell 4 is made feasible.

Further, the second nozzle 73 humidifies reformed gas supplied from the reformer 3 to the fuel cell 4, and accordingly the temperature of gas introduced into the fuel cell 4 is controlled and stable operation of the fuel cell is made feasible.

Third Embodiment

Figure 4:
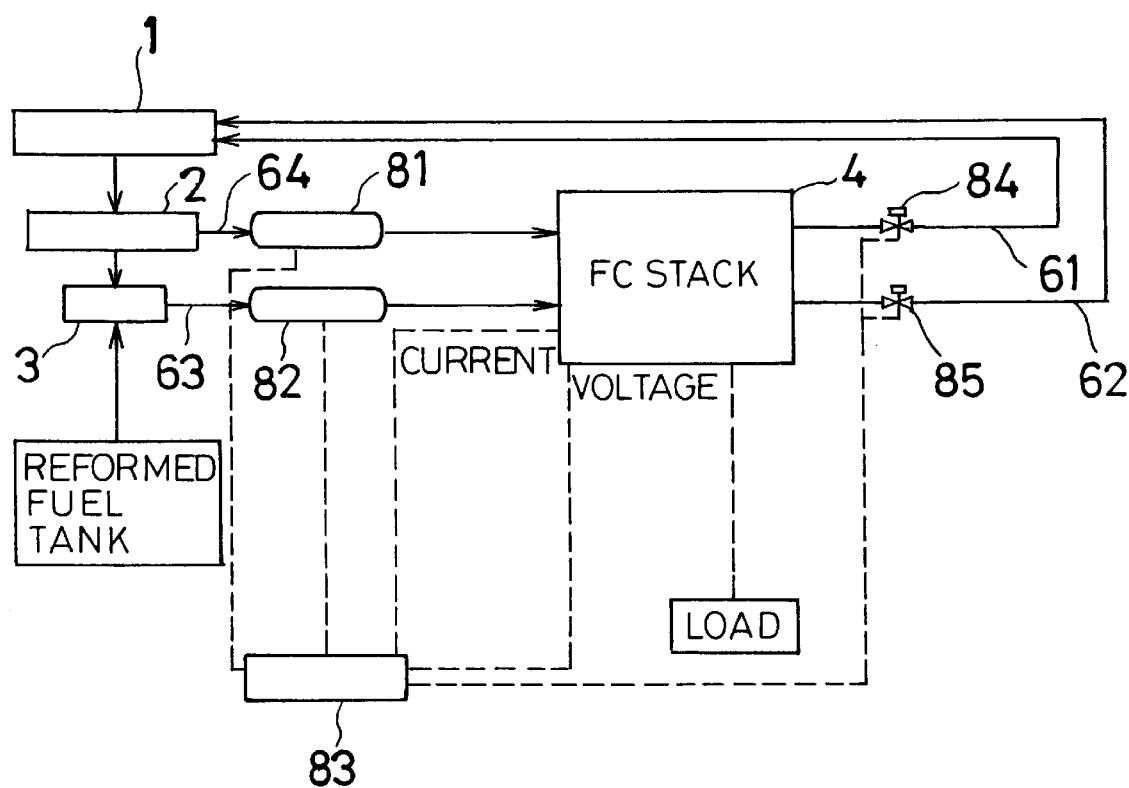
FIG. 4 is a block diagram showing a fuel cell system according to a third embodiment of the invention.

As shown by FIG. 4, according to the third embodiment an amount of air and an amount of reformed gas supplied to the fuel cell 4 are detected and a flow rate of oxygen and a flow rate of hydrogen supplied to the combustor 1 are controlled.

The vehicular mountable fuel cell system according to the third embodiment has a flow rate control valve 85 in a fuel exhaust gas line of the fuel cell stack 4, a flow rate control valve 84 in an oxidant exhaust gas line 61, an exhaust gas combustor 1 and an air supply apparatus 2 having a gas turbine capable of recovering thermal energy as power.

Flow rate meters 81 and 82 for measuring hydrogen and oxygen flow rates as parameters for calculating rates of utilizing hydrogen and oxygen are installed on the gas inlet side of the fuel cell stack 4. An FC controller 83 controls the two flow rate control valves 84 and 85 by monitoring current and voltage of the fuel cell stack and signals from the two flow rate meters 81 and 82 to thereby control gas supply to the exhaust gas combustion burner 1.

The calculating means 83 calculates a flow rate of oxygen and a flow rate of hydrogen supplied from the fuel cell 4 to the combustor 1 based on the detected amount of oxygen and the detected amount of hydrogen and by monitoring the current and voltage of the fuel cell.

The flow rate controller comprises the first flow rate control valve 84 for controlling the flow rate of oxygen and the second flow rate control valve 85 for controlling the flow rate of hydrogen supplied to the combustor in accordance with a control signal from the calculating means.

In a fuel cell system for vehicular use, compact size is an important factor, which means only one burner. Therefore, the amounts of hydrogen and oxygen supplied to the exhaust gas combustor 1 need to be regulated in accordance with the load. The amounts of waste hydrogen and oxygen can be calculated by the FC controller 83 by monitoring the flow rate meters 84 and 85 arranged at the gas outlets of the fuel cell stack 4 and the current and the voltage of the stack. The amount or pressure of gas flowing in the FC stack 4 can be regulated by electrically controlling the air supply apparatus 2 by the FC controller 83.

An explanation will now be given of the operation of the control system according to the third embodiment. As shown by FIG. 4, for fuel gas including hydrogen and an oxidant gas including oxygen for executing an electrochemical reaction in the fuel cell FC stack 4, power can be recovered as thermal energy from exhaust gases by the exhaust gas combustor 1.

For example, air is supplied from the air supply apparatus 2 having a gas turbine or the like to an oxidizing electrode side of the FC stack 4 by passing through the first flow rate meter 81 via an oxidant gas supply pipe. Similarly, fuel gas is supplied from the air supply apparatus 2 to a fuel electrode side of the FC stack 4 by passing through the flow rate meter 82 via the reforming apparatus 3 and the fuel gas supply pipe 63.

According to the third embodiment, the flow rate control valves 84 and 85 are controlled by the FC controller 83, by which appropriate amounts of hydrogen and oxygen are supplied to the exhaust gas combustor 1 and the efficiency of the system is promoted. Gas amounts at outlets of the stack are controlled by using the flow rate regulating valves 84 and 85 without regulating the air supply apparatus 2, and therefore the system has a fast response.

Further, according to the third embodiment waste hydrogen and oxygen from the FC stack 4 are used. Amounts of the waste hydrogen and oxygen vary in accordance with load, particularly in a vehicular FC. Thus the response to a variation in load is fast.

Fourth Embodiment

Figure 5:
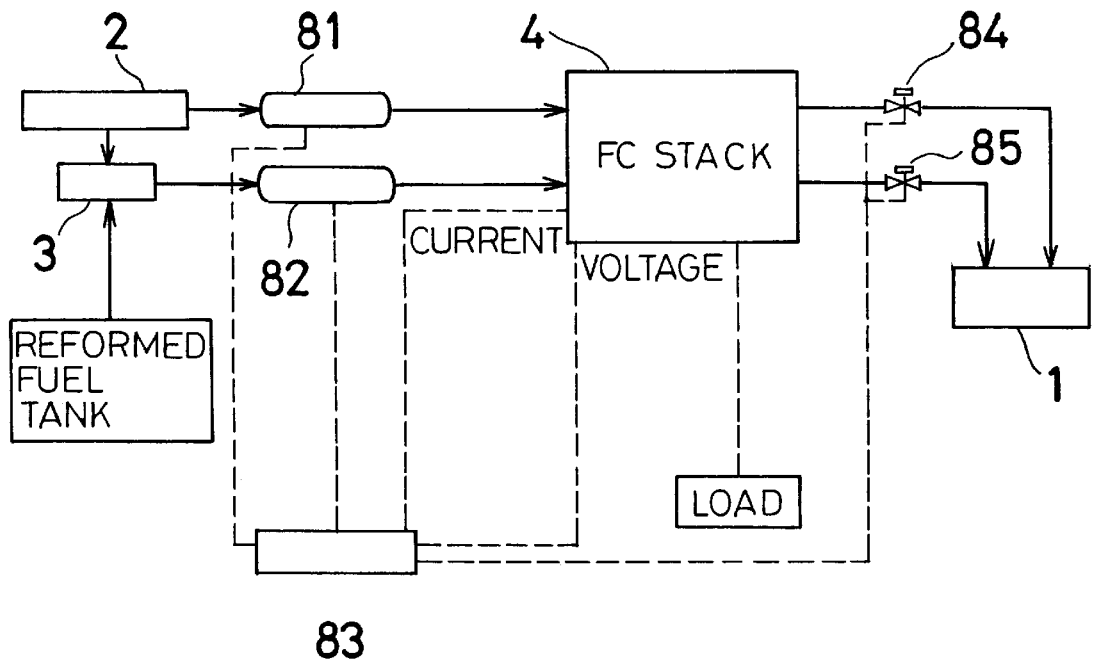
FIG. 5 is a block diagram showing a fuel cell system according to a fourth embodiment of the invention.

As shown by FIG. 5, a point of differences of a vehicular mountable fuel cell system according to the fourth embodiment resides in that the air supply apparatus 2 supplies air to the fuel cell 4 and the reforming apparatus 3 without utilizing the combustion energy of the exhaust gas combusting burner 1. Thus the air supply apparatus 2 does not utilize the combustion energy of the exhaust gas combustor 1, and accordingly the fuel cell 4 is prevented from discharging untreated effluent.

Fifth Embodiment

Figure 6:
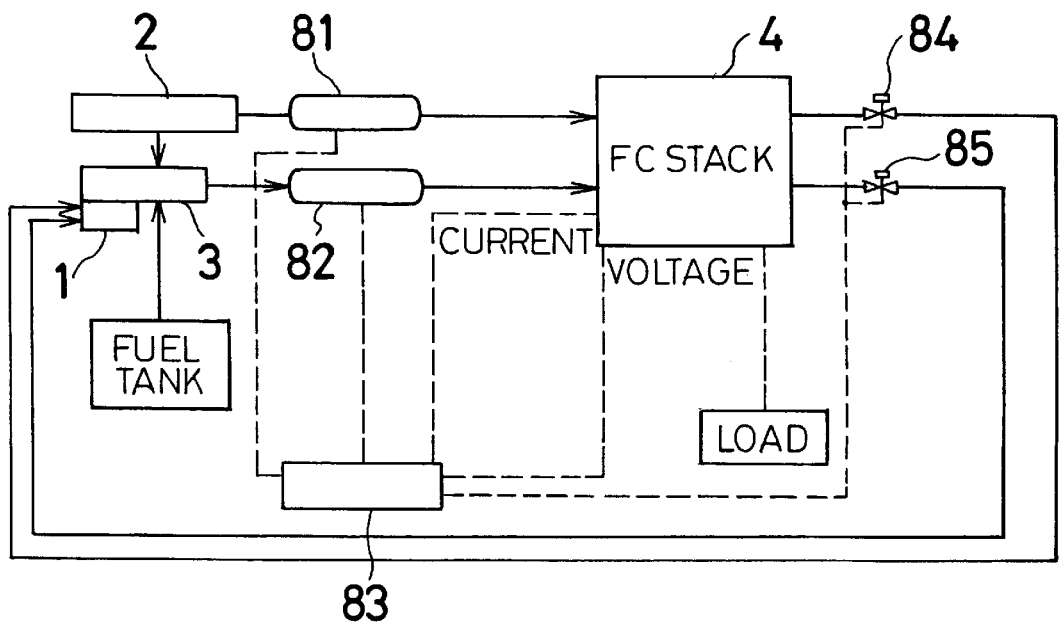
FIG. 6 is a block diagram showing a fuel cell system according to a fifth embodiment of the invention.

As shown by FIG. 6, a point of difference of a vehicular mountable fuel cell system according to the fifth embodiment resides in that the combustion energy of the exhaust gas combustor 1 is used as an evaporation burner of the reformer 3. The evaporation burner of the reformer 3 uses the combustion energy of the exhaust gas combustor 1 and accordingly methanol as fuel for evaporation of the reformer can be dispensed with.

Sixth Embodiment

Figure 7:
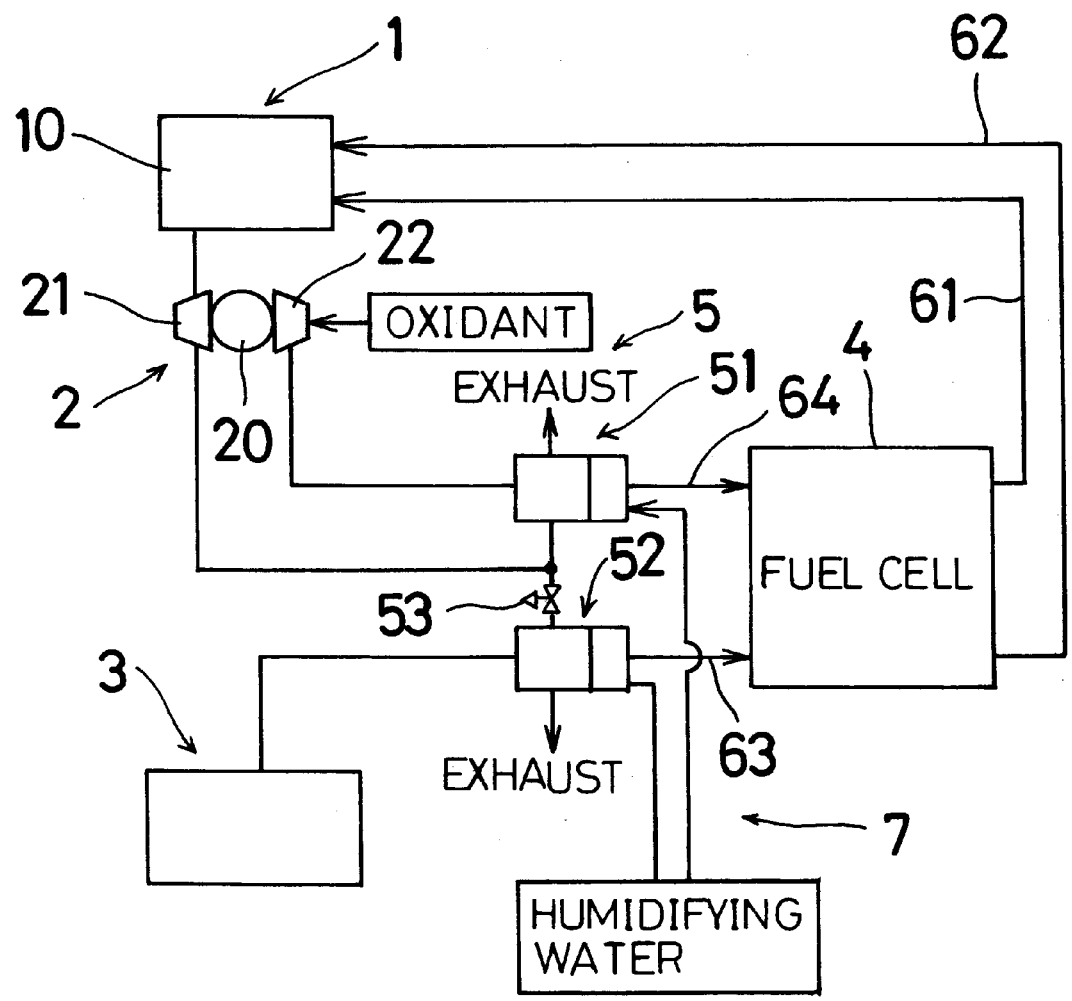
FIG. 7 is a block diagram showing a fuel cell system according to a sixth embodiment of the invention.

As shown by FIG. 7, a point of difference of a vehicular mountable fuel cell system according to the sixth embodiment as compared to the first embodiment resides in that the heat exchanger 5 is constituted such that heat of the combustion exhaust gas exhausted from the combustor 1, heat of humidifying water from the humidifying apparatus 7 and heat of oxygen as an oxidant gas from the compressor unit 22 are exchanged. According to the fuel cell system of the sixth embodiment, in a fuel cell power generating apparatus having the combustor 1 for recovering and combusting off gas from the fuel cell 4, there are installed heat exchangers 51 and 52 for heating to thereby elevate temperature of humidifying water and oxidant gas by heat of the combusted exhaust gas exhausted from the combustor 1.

By installing a flow rate control valve 53 between the turbine unit 21 and the second heat exchanger 52 for exchanging heat of the reformed gas, the rate of combustion exhaust gas flowing into the heat exchangers on the side of the fuel gas and on the side of the oxidant gas is controlled as necessary to thereby heat and elevate the temperatures of the humidifying water, the fuel and the oxidant.

According to the vehicular mountable fuel cell system of the sixth embodiment, the heat exchanger 5 exchanges heat of the combustion exhaust, the gas discharged from the combustor 1, the heat of the humidifying water from the humidifying apparatus 7 and oxygen as the oxidant gas from the compressor unit 22, and accordingly sufficient heat exchange and stable operation of the fuel cell 4 are made feasible.

Further, according to the vehicular mountable fuel cell system of the sixth embodiment, the heat exchanger 5 uses heat from the combustion exhaust gas exhausted from the combustor 1, and accordingly efficient heat exchange and stable operation of the fuel cell 4 are made possible.

Further, according to the vehicular mountable fuel cell system of the sixth embodiment, the first heat exchanger 51 of the heat exchanger 5 heats oxygen as the oxidant gas for fuel gas from the compressor unit 22 and the second heat exchanger 52 heats the reformed gas from the reformer 3, and accordingly efficient heat exchange and stable operation of the fuel cell are made feasible.

Further, according to the sixth embodiment, the flow rate control valve 53 of the second heat exchanger 52 for heating the reformed gas from the reformer 3 controls the flow rate of the combustion exhaust gas exhausted and supplied from the combustor 1, and accordingly the flow rate of the combustion exhaust gas is controlled, the temperature of the reformed gas introduced into the fuel cell 4 is optimally maintained and stable operation of the fuel cell 4 is made feasible.

Seventh Embodiment

Figure 8:
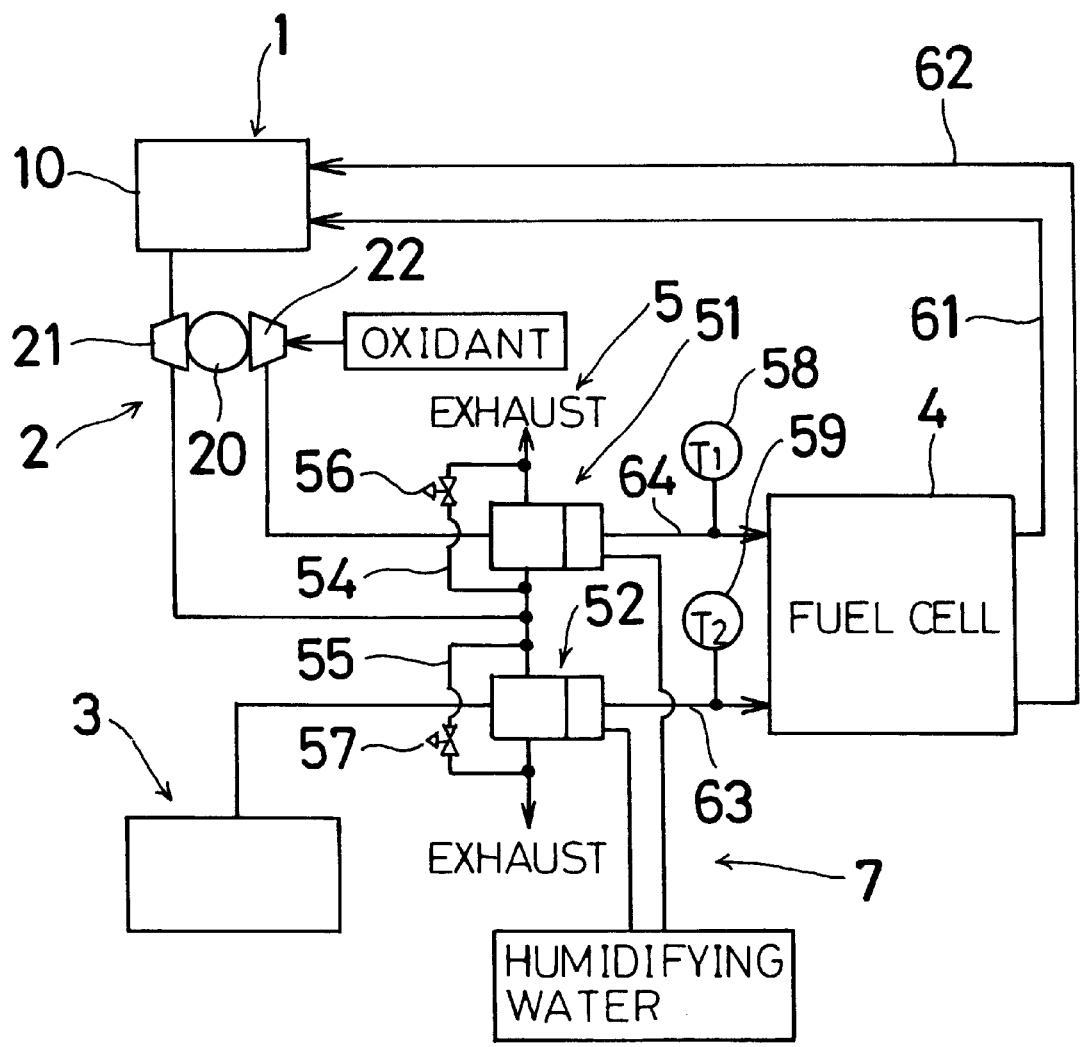
FIG. 8 is a block diagram showing a fuel cell system according to a seventh embodiment of the invention.
Figure 9:
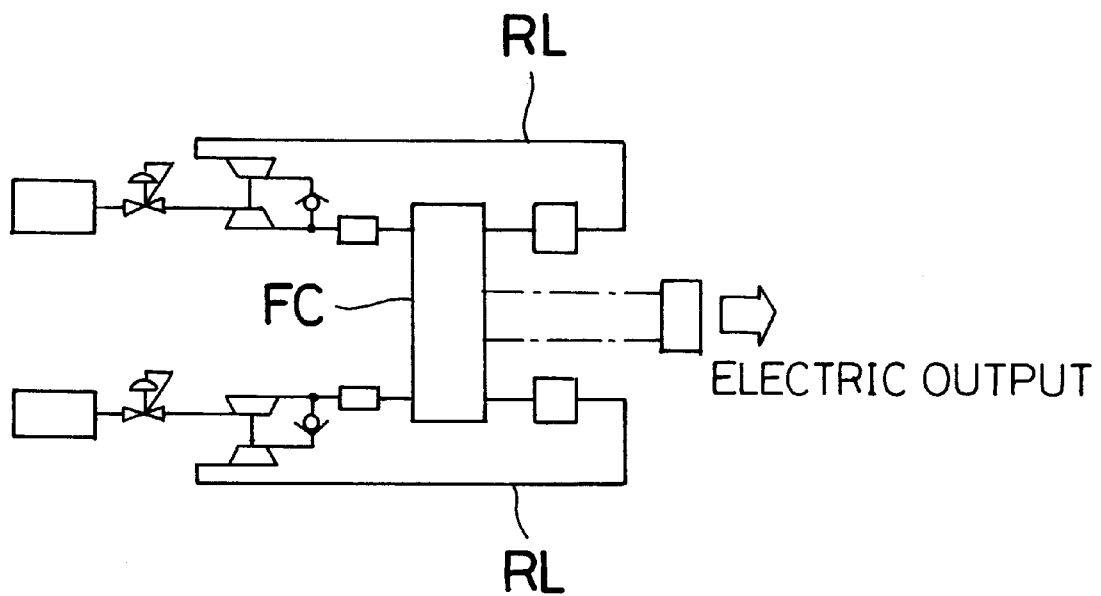
FIG. 9 is a block diagram showing a first conventional fuel cell system.
Figure 11:
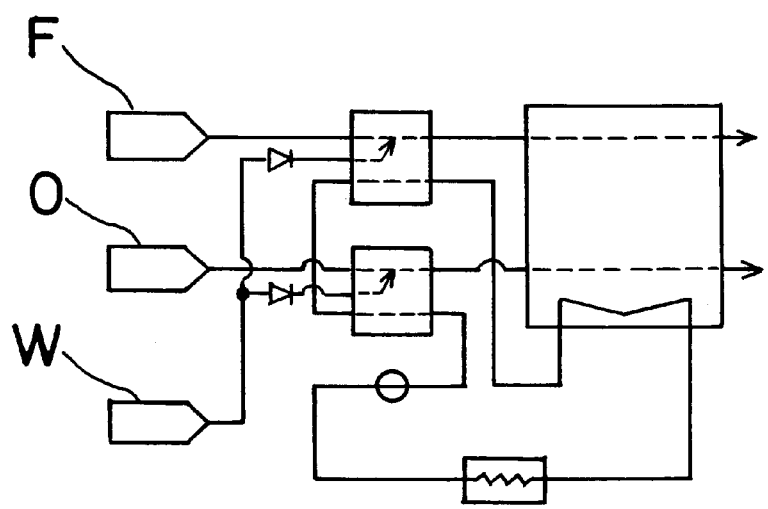
FIG. 11 is a block diagram showing a third conventional fuel cell system.
Figure 10:
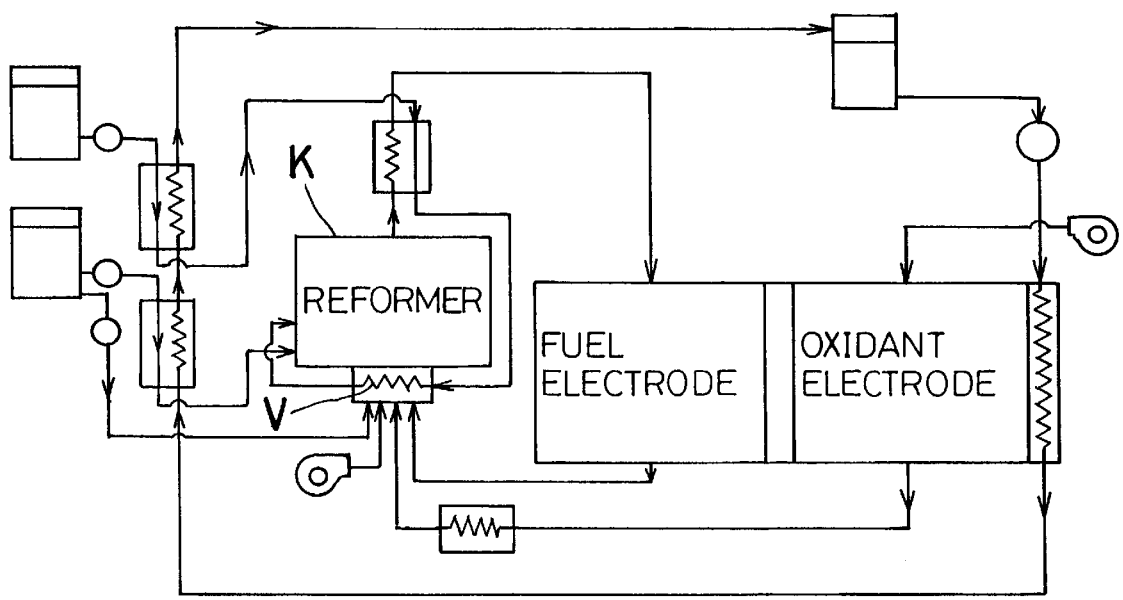
FIG. 10 is a block diagram showing a second conventional fuel cell apparatus.

As shown by FIG. 8, a point of difference of a vehicular mountable fuel cell system according to the seventh embodiment as compared to the sixth embodiment resides in that the first and the second heat exchangers 51 and 52 constituting the heat exchanger 5 respectively have bypass paths 54 and 55 and bypass flow rate controllers 56 and 57 for controlling bypass flow rates of the combustion exhaust gas in the bypass paths. According to the fuel cell system of the seventh embodiment, the heat exchanger unit is fed the combustion exhaust gas and has the bypass lines 54 and 55 and the flow rate control valves 56 and 57. Temperature detectors 58 and 59 are installed at the fuel gas and the oxidant gas lines 63 and 64.

According to the fuel cell system of the seventh embodiment, by controlling the amounts of the combustion exhaust gas flowing into the heat exchangers 51 and 52 by the flow rate control valves 56 and 57 while monitoring detected temperatures $T_1$ and $T_2$ of the fuel gas and the oxidant gas lines, the temperature of gas flowing into the fuel cell is maintained at an optimum value and stable operation of the fuel cell 4 is made feasible.

The above-described embodiments have been exemplified for explanation and the invention is not limited thereto but modifications and additions are possible so far as the modifications or additions are not against technical thought of the invention capable of being recognized by the skilled person from the scope of claims, the detailed description of the invention and the description of the drawings.

What is claimed is:

1. A fuel cell system comprising:
    a combustor connected for combusting an off gas from a fuel cell supplied with a reformed gas from a reformer;
    a turbine compressor connected to the fuel cell so as to supply air to the fuel cell by compressing air, the turbine compressor including a compressor unit utilizing combustion energy of the combustor;
    a flow rate sensor for detecting a flow rate of the air supplied from the compressor unit to the fuel cell;
    a flow rate sensor for detecting a flow rate of the reformed gas supplied from the reformer to the fuel cell;
    calculating means for calculating a flow rate of oxygen and a flow rate of hydrogen to be supplied from the fuel cell to the combustor based on a detected amount of the air and a detected amount of the reformed gas; and
    flow rate controlling means for controlling the flow rate of oxygen and the flow rate of hydrogen to be supplied to the combustor in accordance with a control signal from the calculating means.

2. The fuel cell system according to claim 1 wherein the calculating means monitors current and voltage of the fuel cell.

3. The fuel cell system according to claim 2 wherein the calculating means calculates the flow rate of oxygen and the flow rate of hydrogen supplied to the combustor based on a monitored current and a monitored voltage fuel cell.

4. The fuel cell system according to claim 1, further comprising a first humidifying apparatus communicating with the air supplied from the compressor unit to the fuel cell for humidifying the air supplied from the compressor unit to the fuel cell.

5. The fuel cell system according to claim 4, further comprising a second humidifying apparatus connected to the reform gas supplied from the reformer to the fuel cell for humidifying the reform gas supplied from the reformer to the fuel cell.

6. The fuel cell system according to claim 5 wherein the heat exchanger is constituted such that heat exchange is carried out among the combustion exhaust gas exhausted from the combustor, humidifying water from the humidifying apparatuses and air as an oxidant gas from the compressor unit.

7. The fuel cell system according to claim 6 wherein the heat exchanger is heated by combustion exhaust gas exhausted from the combustor.

8. The fuel cell system according to claim 7:
    wherein the heat exchanger comprises:
        a first heat exchanger for heating the oxygen (air) as an oxidant gas from the compressor unit; and
        a second heat exchanger for heating the reformed gas from the reformer.

9. The fuel cell system according to claim 8 wherein the second heat exchanger for heating the reformed gas from the reformer includes a flow rate controller for controlling a flow rate of the combustion exhaust gas exhausted and supplied from the combustor.

10. The fuel cell system according to claim 9 wherein each of the first and the second heat exchangers includes a bypass path and bypass flow rate controller for controlling a bypass flow rate of the combustion exhaust gas in the bypass path.

* * * * *